(12) United States Patent
Moyer et al.

(10) Patent No.: US 8,261,047 B2
(45) Date of Patent: Sep. 4, 2012

(54) QUALIFICATION OF CONDITIONAL DEBUG INSTRUCTIONS BASED ON ADDRESS

(75) Inventors: William C. Moyer, Dripping Springs, TX (US); Michael D. Snyder, Cedar Park, TX (US); Gary L. Whisenhunt, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 506 days.

(21) Appl. No.: 12/049,984

(22) Filed: Mar. 17, 2008

(65) Prior Publication Data
US 2009/0235059 A1    Sep. 17, 2009

(51) Int. Cl.
G06F 11/36    (2006.01)
(52) U.S. Cl. .......................... 712/227; 714/35
(58) Field of Classification Search .................. 712/227; 717/129
See application file for complete search history.

(56) References Cited

U.S. PATENT DOCUMENTS

| | | | |
|---|---|---|---|
| 4,992,933 A | | 2/1991 | Taylor |
| 5,491,793 A | | 2/1996 | Somasundaram et al. |
| 6,289,300 B1 | | 9/2001 | Brannick et al. |
| 6,587,967 B1 | * | 7/2003 | Bates et al. ..................... 714/35 |
| 6,834,338 B1 | | 12/2004 | Hoyle et al. |
| 7,047,520 B2 | * | 5/2006 | Moore et al. .................. 717/129 |
| 2001/0032305 A1 | * | 10/2001 | Barry ............................ 712/34 |
| 2003/0154463 A1 | | 8/2003 | Betker et al. |
| 2005/0240820 A1 | | 10/2005 | Vannerson et al. |
| 2005/0289396 A1 | * | 12/2005 | Hooper et al. .................. 714/34 |
| 2007/0006158 A1 | | 1/2007 | Takuma et al. |
| 2007/0050682 A1 | | 3/2007 | Takuma et al. |

OTHER PUBLICATIONS

Patterson et al., "Computer Organization and Design: The Hardware/Software Interface", 2nd edition, 1997.*
Yeon-Ho Im, et al.; "Co-Development of Media-processor and Source-level Debugger using Hardware Emulation-based Validation"; in 6th International Conference on VLSI and CAD, IEEE, 1999, ISBN 0-7803-5727-2, pp. 95-98.
PCT Application No. PCT/US2009/032793 Search Report and Written Opinion mailed Jul. 20, 2009.
Freescale Semiconductor, "EREF: A Programmer's Reference Manual for Freescale Embedded Processors (Including the e200 and e500 Families)", © 2007, Chapter 5, pp. 5-1 through 5-50, downloaded from http://www.freescale.com/files/32bit/doc/ref_manual/EREFRM.pdf-billm.
U.S. Appl. 11/871,847, filed Oct. 12, 2007, entitled "Debug Instructions for Use in a Data Processing System", by Inventors William C. Moyer, Michael D. Snyder, and Gary L. Whisenhunt.

* cited by examiner

Primary Examiner — Chun-Kuan Lee
Assistant Examiner — Jesse R Moll
(74) Attorney, Agent, or Firm — Zagorin O'Brien Graham LLP

(57) ABSTRACT

A processor implementation supports selection of an execution mode for debug instruction instances based on respective addresses thereof in addressable memory can provide an attractive mechanism for executing debug instructions in a way that allows some instances of the instructions to operate with debug semantics while suppressing other instances by executing them with no-operation (NOP) semantics. In some embodiments, selection of operative execution semantics may be based on attributes of a memory page in which a particular debug instruction instance resides. In some embodiments, portions of an address space may be delimited (e.g., using values stored in bounding registers and addresses of particular debug instruction instances compared against the delimited portions to select appropriate execution semantics. In some embodiments, both types of evaluations may be used in selecting appropriate execution semantics for a particular debug instruction instance.

20 Claims, 6 Drawing Sheets

QUALIFICATION OF CONDITIONAL DEBUG INSTRUCTIONS BASED ON ADDRESS

BACKGROUND

1. Field

This disclosure relates generally to data processing systems, and more specifically, to use of a debug instruction in a data processing system.

2. Related Art

Debug instructions are commonly used during software development to allow debug operations to take place. Once the software has been developed and checked with debug instructions, these debug instructions are removed so as not to cause undesired exceptions in the software application. However, removal of these debug instructions can change the execution characteristics of the system and may be especially problematic in real-time applications.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
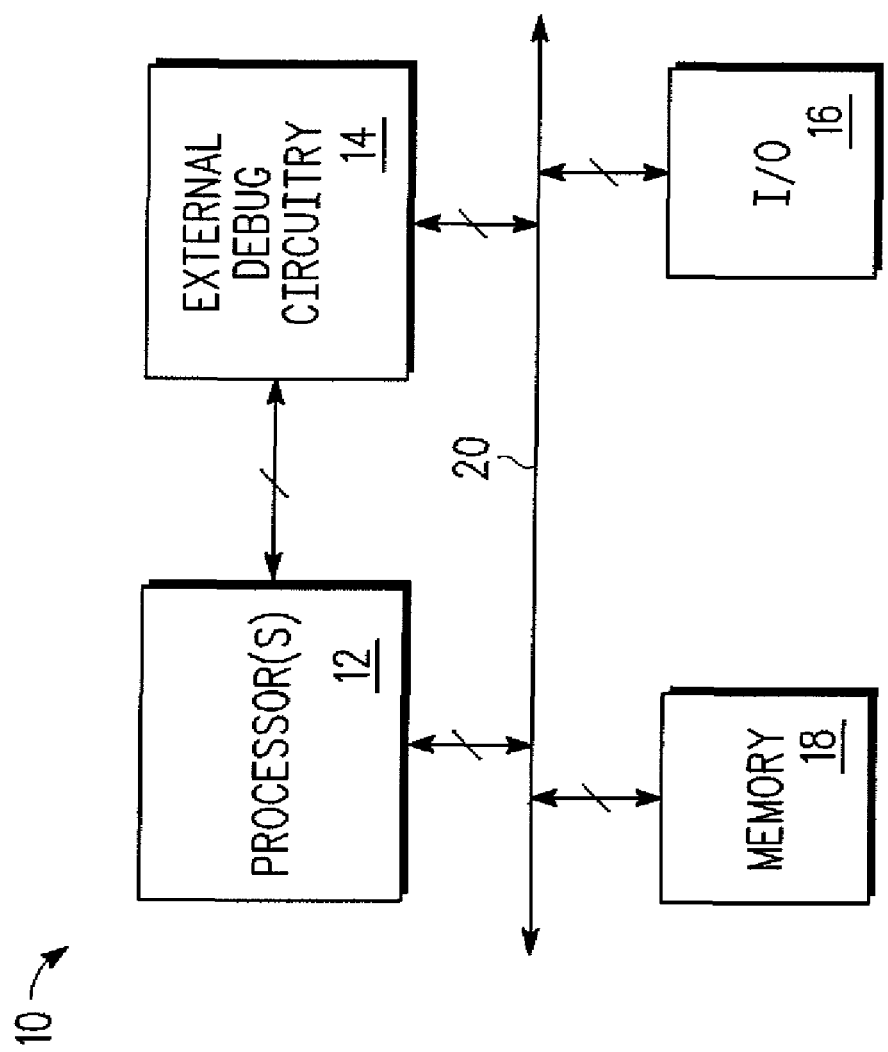
FIG. 1 is a block diagram of a data processing system, in accordance with one or more embodiments of the present invention.

Debug instructions are supported in various processor implementations to facilitate conditional entry into a debug halted mode or to facilitate generation of a software debug exception (e.g., a debug interrupt). In either case, by placing such debug instructions in the very code whose operation is being evaluated, tested or debugged, a developer is able to initiate debug operations under software control and based on a current state of the execution environment. Once software development and/or testing is complete, those debug instructions that remain in production code can trigger undesired exceptions and debug behaviors unless removed or suppressed. Unfortunately, removal of the debug instructions tends to change execution characteristics of the system. That is, the code image itself changes since branch targets, page boundaries, and other instruction relationships may change upon removal of the debug instructions. These changes may be particularly problematic in real-time code.

As a result, techniques are desired that allow a production code image to remain substantially unchanged while operation of at least selected debug instructions therein is suppressed. Since subsequent generations of a given software system and, indeed, even newly developed systems and new deployments of existing systems, may reuse code in which such debug instruction remain, it would be desirable if suppression of debug instructions could affect certain debug instruction instances (e.g., those that reside in stable code) but not others.

It has been discovered that a processor implementation that supports selection of an execution mode for debug instruction instances based on respective addresses thereof in addressable memory can provide an attractive mechanism for executing debug instructions in a way that allows some instances of the instructions to operate with debug semantics while suppressing other instances by executing them with no-operation (NOP) semantics. In some embodiments, selection of operative execution semantics may be based on attributes of a memory page in which a particular debug instruction instance resides. In some embodiments, portions of an address space may be delimited (e.g., using values stored in bounding registers) and addresses of particular debug instruction instances compared against the delimited portions to select appropriate execution semantics. In some embodiments, both types of evaluations may be used in selecting appropriate execution semantics for a particular debug instruction instance.

For concreteness, we focus on certain illustrative processor designs, memory organizations, debug-type instructions and debugging environments. For example, in some embodiments, a processor that implements a debug notify halt (dnh) instruction is adapted to provide selective execution semantics for instances of the dnh instruction based on memory address or region in which the instance resides. In some embodiments, a memory management unit annotates instruction instances (e.g., as they are fetched from memory) in accord with memory page, segment or region match (or mismatch) criteria and execution semantics are selected based on the annotation. In some embodiments, decode logic is employed to supply signals or opcodes for a NOP-type instruction implemented by the processor in place of those signals or opcodes ordinarily supplied for execution of a debug instruction for which NOP semantics are not selected. Of course, techniques described herein have broad applicability to other debug instructions and in other processor designs, but will be understood and appreciated by persons of ordinary skill in the art based on the illustrated context.

Accordingly, in view of the foregoing and without limitation on the range of debug type instructions, underlying processor or system architectures, address match criteria, and mechanisms for selecting appropriate execution semantics that may be employed in embodiments of the present invention, we describe certain illustrative embodiments.

Processors and Conditional Debug, Generally

FIG. 1 illustrates a data processing system 10 consistent with some embodiments of the invention. In general, data processing system 10 may be implemented on a single integrated circuit or on a plurality of integrated circuits. In some cases, data processing system 10 may be implemented as a system-on-chip. In the illustrated configuration, data processing system 10 includes processor(s) 12, external debug circuitry 14, I/O module 16, and memory 18. Components of data processing system 10 are interconnected and interoperate using any suitable techniques. For simplicity, we illustrate interconnection amongst major functional blocks via bus 20, although persons of ordinary skill in the art will recognize that any of a variety of interconnection techniques and topologies may be employed without departing from the present invention.

Typically, implementations of processor(s) 12 include fetch buffers or other facilities for storing instructions to be executed by the processor(s), decoder and sequencing logic, one or more execution units, and register storage, together with suitable data, instruction and control paths. At any given time, consistent with a computation performed by processor(s) 12, units of program code (e.g., instructions) and data reside in memory 18, in one or more levels of cache(s) and/or in processor stores (such as a fetch buffer, registers, etc.) In general, any of a variety of memory hierarchies may be employed, including designs that separate or commingle instructions and data in memory or cache. Memory 18 (or any portion thereof) may be located on the same integrated circuit as a processor, may be located on a different integrated circuit than processor(s) 12 or may span multiple integrated circuits. In addition, memory 18 may include storage of any suitable type, such as, for example, read only memory (ROM), random access memory (RAM), non-volatile memory (e.g., Flash), etc. External debug circuitry 14 may be contained on the same integrated circuit as a processor, or may be implemented as a separate system independent of any integrated circuits or system-on-chip containing processor(s) 12.

Figure 2:
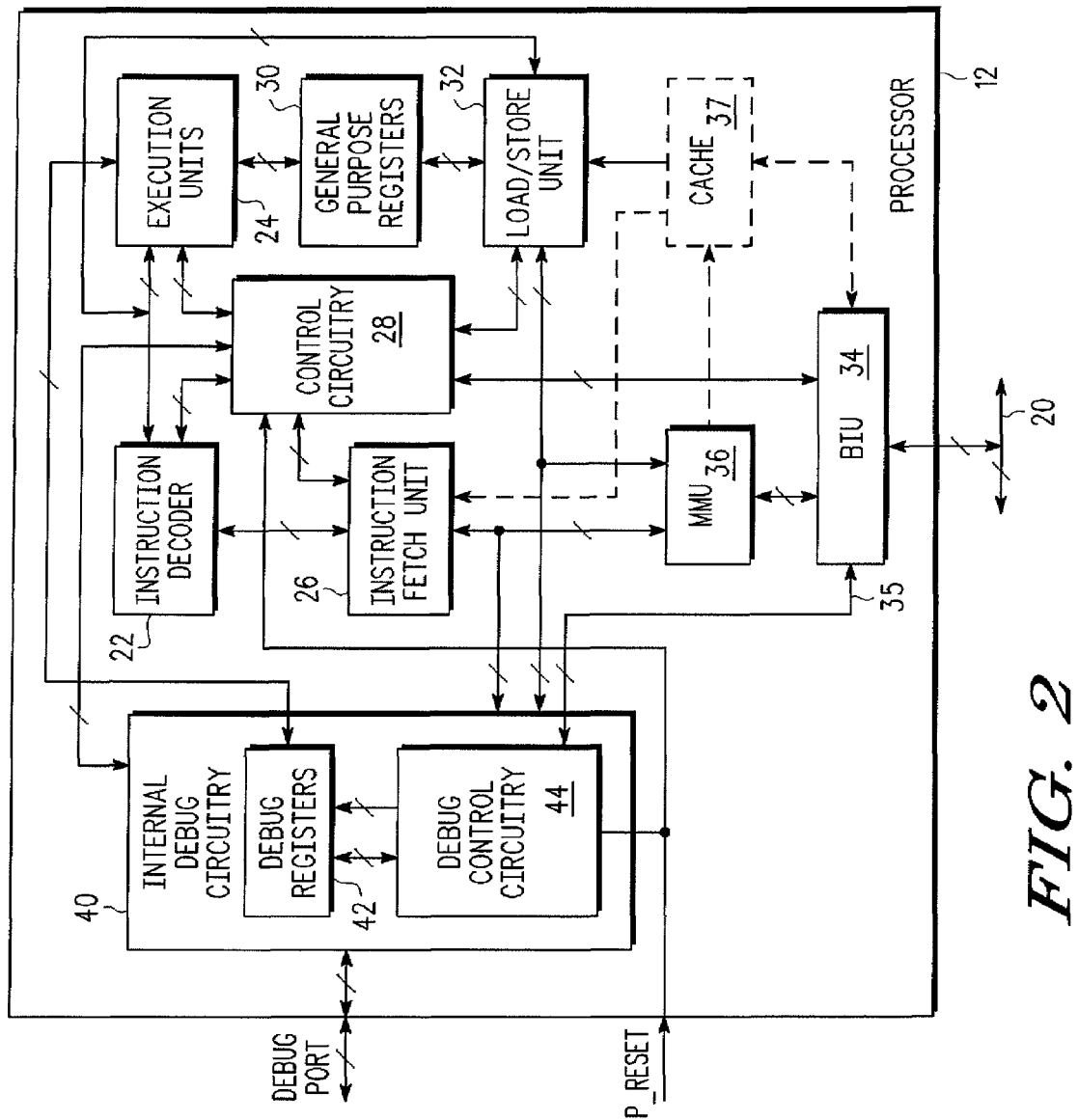
FIG. 2 is a block diagram of a processor in accordance with one or more embodiments of the present invention.

FIG. 2 is a block diagram of a processor instance corresponding to processor(s) 12 of data processing system 10 (see FIG. 1), now referred to as processor 12. Processor 12 includes an instruction decoder 22, execution units 24, instruction fetch unit 26, control circuitry 28, general purpose registers 30, load/store unit 32, bus interface unit (BIU) 34 and internal debug circuitry 40. Processor 12 communicates with other components of a data processing system via bus 20 coupled to BIU 34. Typically, other components include memory (potentially including cache(s)) and I/O components, as previously illustrated with reference to FIG. 1.

Note that, in the illustrated embodiment, memory management unit (MMU) 36 coordinates address translations (e.g., in accord with an implemented segmentation or paged memory model) and provides a convenient place to implement some of the conditional debug controls described herein. Accordingly, in the description that follows, we illustrate some designs that include an MMU facility. Nonetheless, based on the description herein, persons of ordinary skill in the art will recognize that other components along the instruction path from memory to execution units 24 (e.g., instruction fetch unit 26 and instruction decoder 22) may host analogous conditional debug controls or portions of the particular controls described, particularly in embodiments that may omit an MMU. FIG. 2 also illustrates an optional cache 37 which may be provided (e.g., on-chip) together with processor 12 in some embodiments. Optional cache 37 is illustrated as an integrated data/instruction cache, although persons of ordinary skill in the art will recognize that separate data and instruction portions may be provided, if desired, and some embodiments may co-locate only a data-portion or only an instruction-portion together with processor 12.

Internal debug circuitry 40 monitors activity within processor 12 and, in response to detecting one or more predetermined conditions based on stored debug configuration information present within debug registers 42 or elsewhere within processor 12, may generate one or more data breakpoint events, instruction breakpoint events, instruction execution events such as a branch or trap taken event, an instruction completion event or the like. Internal debug circuitry 40 may be coupled to external debugging units, such as an IEEE ISTO-5001 compliant Nexus™ debugging unit via debug port shown in FIG. 2. External debugging units may include all or a portion of external debug circuitry 14 shown in FIG. 1. Nexus™ is a trademark of Freescale Semiconductor, Inc., Austin, Tex. Debug port may be a serial interface, such as JTAG, or may be implemented as a parallel port, a combination of serial and parallel ports, or as an Ethernet port. In some embodiments, processor 12 may interface internal debug circuitry to other debug circuitry on-chip using an appropriate interconnect or signaling mechanism.

As illustrated, internal debug circuitry 40 includes debug registers 42 and debug control circuitry 44. Debug registers 42 typically include bits grouped in fields for controlling various debug related events, including instruction breakpoints, data breakpoints, watchpoints, and other messaging associated with debugging. Generally, these debugging resources may be shared between processor 12 and external debug circuitry 14, and, in any case, may be employed to establish predicate states (such as memory page attributes, marked segments or regions, and/or combinations of address-identifiers) that selectively enable (or disable) based on addresses, the conditional debug controls described herein.

In general, debug registers 42 provide storage for one or more address comparison values, address ranges, and data match values that may be useful for implementing instruction and/or data access breakpoint and watchpoint events, and other debug control criteria. These address and data values, along with various control criteria, are used to determine when processor 12 accesses one or more predetermined instruction addresses or data addresses for the purpose of generating a breakpoint or watchpoint event, which can cause processor 12 to begin exception processing for a debug exception when internal debug mode is active, or cause processor 12 to enter a debug halted mode in which it responds to commands provided by external debug circuitry 14 through the debug port of internal debug unit 40 when external debug mode is active.

By way of example, and not limitation, debug registers 42 may include debug control registers suitable for storage of debug configuration information, instruction address compare registers and data address compare registers, as well as debug status registers, debug counters and data value compare registers. In general, debug registers 42 may be a visible part of the user's software programming model. Debug counters may be configured to count-down when one or more count-enabled events occur. When a count value reaches zero, a debug count event may be signaled and a debug interrupt may be generated, if enabled. Data value compare registers may store data values for data comparison purposes, such as in the implementation of conditional breakpoints.

In an internal debug mode, register resources are managed by software, and no external debug circuitry usage is required. Software may configure the registers through data movement using move to and from special purpose register instructions which are software instructions to initialize the individual debug registers for performing software-based debugging activities. Enabled debug events trigger software debug interrupts. A software interrupt handler may then perform various desired activity which is determined by the software programmer of data processing system 10.

In an external debug mode, external debug circuitry 14 may be assigned ownership of shared debug registers of debug registers 42, and when a configured debug event occurs, processor 12 may enter a halted state and wait for a command to be provided by external debug circuitry 14. Software no longer has control of the shared debug resources when external debug mode is enabled. In some embodiments, debug registers 42 include external debug control registers located within debug registers 42 or elsewhere within processor 12, which may not be part of the user's software programming model. That is, software executing on processor 12 may not have visibility of external debug control registers. External debug circuitry 14 may access the shared debug resources and any dedicated external debug resources directly via the debug port (as shown in FIG. 2), which may be, for example, implemented as a JTAG TAP port. In one embodiment, debug registers 42 and external debug control registers may be mapped as JTAG data registers with register selection encodings contained within one or more fields for the various JTAG instructions, which provide for read and write accesses to the registers by the debugger through JTAG IR and DR operations.

By way of example, and not limitation, we now summarize two examples of conditional debug-type instruction for which operation of a given instance thereof may be qualified (using techniques described herein) based on the address at which the instance appears in memory addressable by a processor. The examples are the debug notify halt (dnh) instruction and breakpoint instruction codings implemented by processor cores such as e700/e500 and e200 Core families of cores available from Freescale Semiconductor for cost-sensitive, embedded real-time applications such as in the MPC5000 family of automotive microcontrollers (MCUs).

The dnh instruction provides a bridge between execution of instructions on the core in a non-halted mode and subsequent operations of an external debug facility. In particular, the dnh instruction allows software to transition the core from a running state to a halted state (if enabled by an external debugger), and to notify the external debugger with both a message and bits coded in the instruction itself. As typically implemented, the dnh instruction is a conditional debug instruction in that its runtime effect is determined by the state of certain indications that may be set in debug control registers (see e.g., FIG. 2, debug registers 42). For example, in one implementation, if a DNH_NOP indication is set by either the external debug facility or by software and a DNH_EN indication is cleared, dnh instruction instances are executed as nops. If a DNH_WPT indication is set, a watchpoint is signaled external to the CPU.

Coarse grain control mechanisms (e.g., appropriate use of the DNH_NOP and DNH_EN indications) allow the dnh instruction to be treated as a nop, when desirable, instead of halting the processor in a debug state or taking an illegal instruction exception. This control allows dnh instructions to remain embedded in the code image of the application after code development, yet remain innocuous by simply acting as nop operations. In this manner, the code image itself need not change, and predictable execution is provided, since branch targets, page boundaries, and other instruction relationships remain unchanged. However, coarse grain control of all (or even of an entire group of) instances of a dnh-type instruction may not provide adequate granularity to allow a dnh instruction instance in stable code to be treated as a nop, while simultaneously allowing another dnh instruction instance to operate as a halt or watchpoint.

Note that commonly-owned U.S. application Ser. No. 11/871,847, filed Oct. 12, 2007, entitled "DEBUG INSTRUCTION FOR USE IN A DATA PROCESSING SYSTEM" and naming Moyer, Snyder and Whisenhunt as inventors discloses a dnh2 variant of the previously described dnh instruction in which the dnh2 instruction format allows individual dnh2 instruction instances to be associated with one of a finite number of control groups, such that group-specific control mechanisms (e.g., use of group-specific GROUPx.D-NH_NOP and GROUPx.DNH_EN indications) may be used to determine, for each group, appropriate execution semantics. Although we focus illustratively on the dnh instruction, based on the description herein, persons of ordinary skill in the art will appreciate that the address-qualified debug controls described herein may be applied to designs that implement instruction variants such as the dnh2 instruction.

Similarly, a breakpoint (bkpt) instruction can be employed in some embodiments of the present invention as a debug instruction for which address qualification is provided. In some instruction set implementations, a breakpoint instruction may not be explicitly defined by the instruction set architecture (ISA), but may be implemented as an illegal instruction opcode, which upon execution, generates an exception or fault that may be dispatched for handling by a debug facility. In some ISAs and implementations, a bkpt instruction opcode (or some similar instruction coding) may be defined and provided. For clarity of description, and without limitation or loss of generality, we refer to a breakpoint instruction as if it were a defined instruction set coding (e.g., a bkpt instruction).

As before, coarse grain control mechanisms allow the bkpt instruction to be treated as a nop, when desirable, instead of halting the processor in a debug state. This control allows bkpt instructions to remain embedded in the code image of the application after code development, yet remain innocuous by simply acting as nop operations. As before, predictable execution may be provided since branch targets, page boundaries, and other instruction relationships remain unchanged. However, also as before, coarse grain control of all (or a group of) instances of a bkpt instruction may not provide adequate granularity to allow a bkpt instruction instance in stable code to be treated as a nop, while simultaneously allowing another bkpt instruction instance to operate as a breakpoint.

Accordingly, we describe techniques whereby qualification of debug instruction instances by address may be employed to specialize behavior of particular instances of dnh, bkpt and/or other debug-type instructions. Based on the description herein, persons of ordinary skill in the art will appreciate a wide variety of applications to processors and systems that implement similar or analogous debug instructions.

Figure 3:
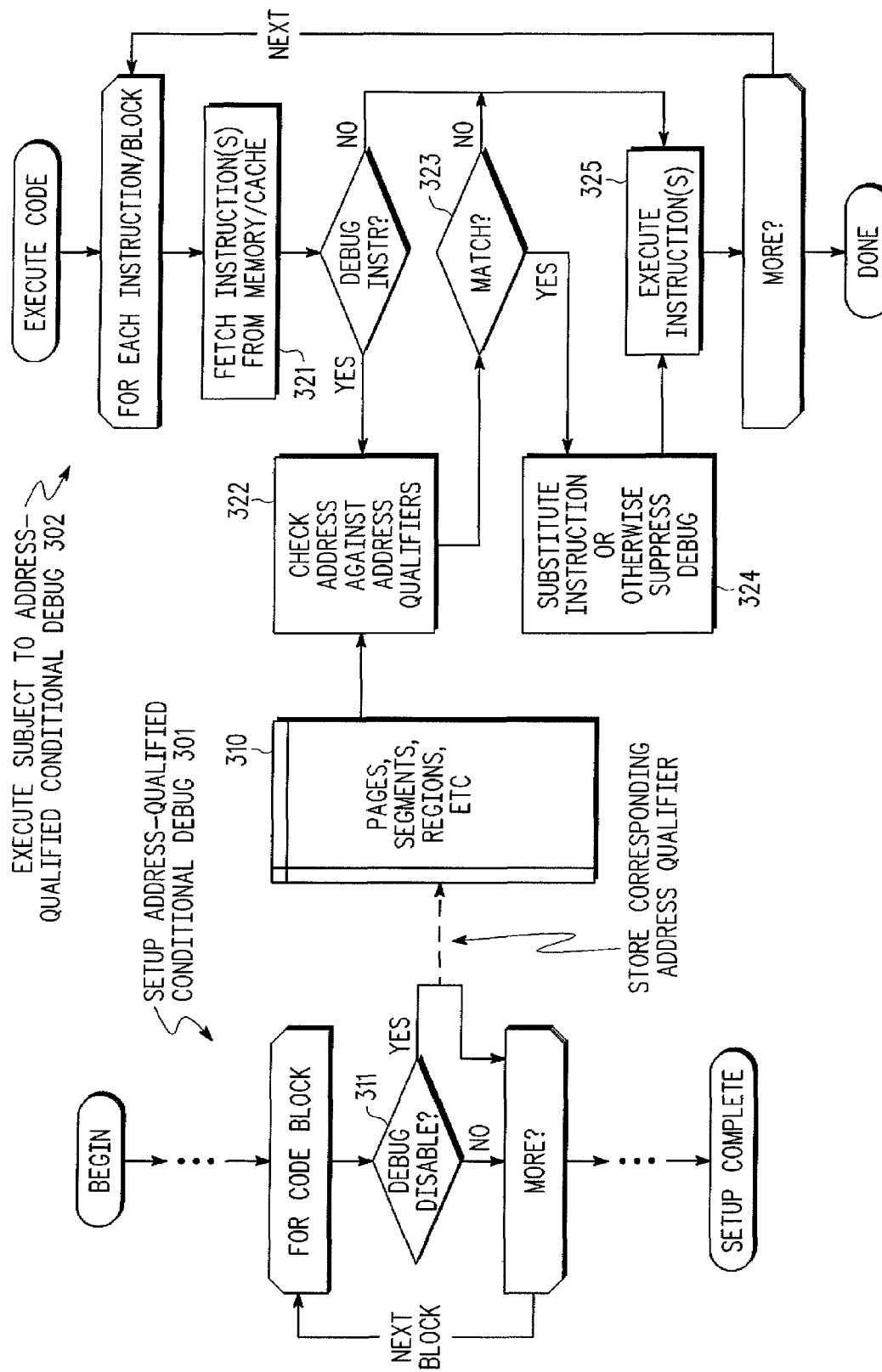
FIG. 3 is a flow chart that illustrates address-qualified conditional debug operation of one or more embodiments of the present invention.

FIG. 3 is a flow chart that illustrates setup and operation of an address-qualified conditional debug technique in accordance with one or more embodiments of the present invention. To the left of the drawing, a setup 301 sequence is illustrated for address-qualified conditional debug. For example, in some embodiments, individual code blocks are considered (311) for disabling (or enabling) of debug-type instruction instances such as dnh, dnh2, bkpt, etc. appearing therein. As a general proposition, code blocks can be of any suitable granularity and may correspond to functions, procedures, modules, sub-sequences of instructions, etc. Using whatever granularity is provided by store 310 of address qualifiers, setup sequence 301 stores corresponding page frame identifiers, segment identifiers, region identifiers (e.g., as base address/mask pairs) and/or any other address-based qualifiers for varying operation or behavior of individual debug instruction instances.

During code execution (302) on a processor such as processor 12 (recall FIG. 2), each instruction (or group of instructions) is fetched (321), typically from memory or cache in preparation for decode and eventual execution of the instruction (or instructions) in accord with program sequencing. For debug instruction instances, the particular memory address at which the particular instance is found in memory is checked (322) against address-based qualifiers in store 310. If a page, segment or range of memory addresses indicated in store 310 matches (323) the particular memory address of the debug-type instruction instance, then debug execution semantics are suppressed (324) for that instruction instance. Typically, a nop instruction opcode is substituted for the matching instruction instance by an instruction fetch or decode unit (see e.g., FIG. 2, instruction fetch unit 26, instruction decoder 22) although other suppression mechanisms may be employed, if desired. Finally, the corresponding instruction (with debug execution semantics are suppressed) is executed (325).

Figure 4:
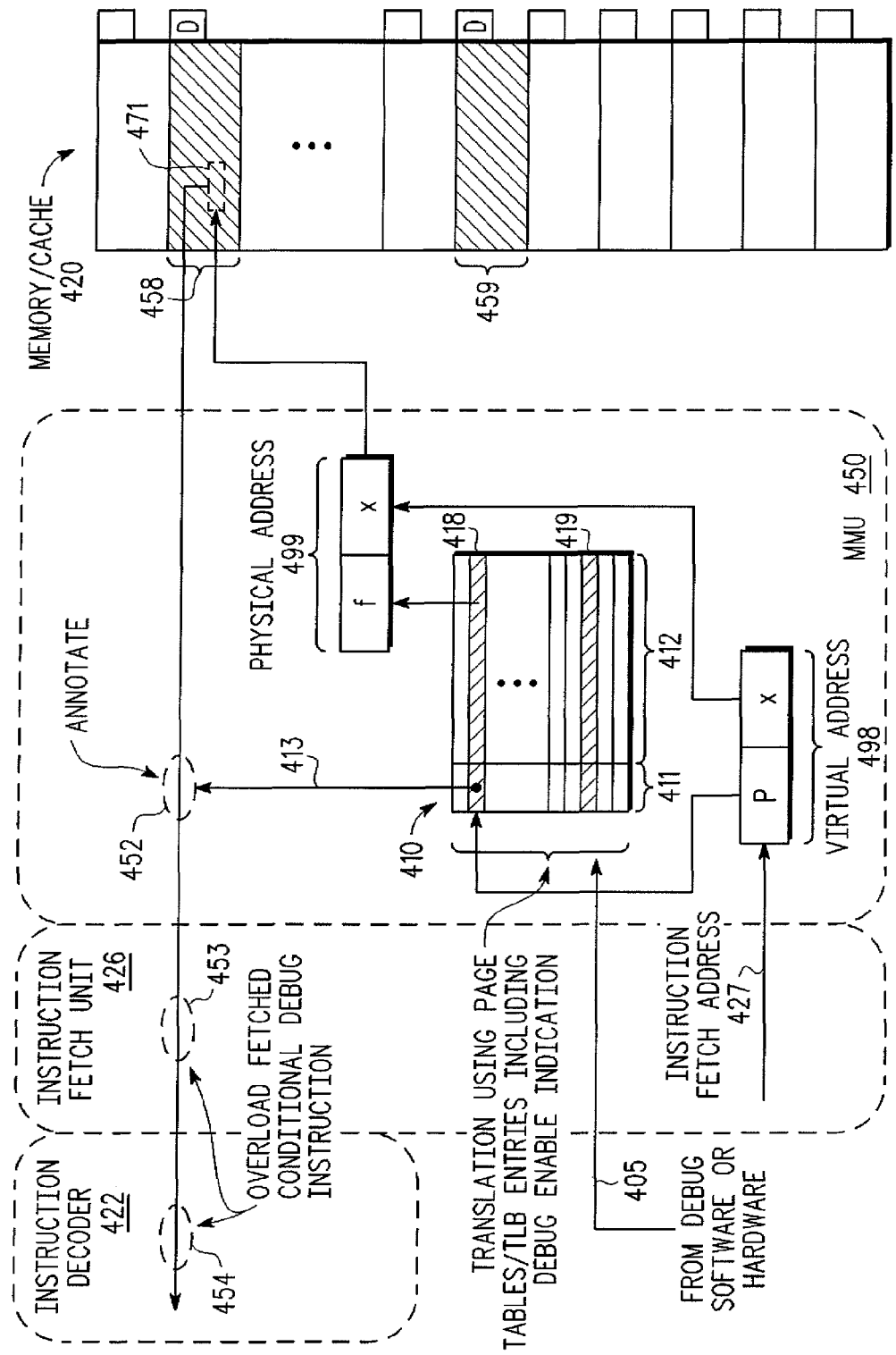
FIG. 4 illustrates operation of one or more embodiments of the present invention using memory paging system attributes to facilitate conditional debug operation based on address.

FIG. 4 illustrates operation of one or more embodiments of the present invention in which memory paging system attributes are used to facilitate conditional debug operation based on the memory address of a particular debug instruction instance. As previously explained, address-based qualifiers are represented in a store based on indications supplied from debug hardware and/or software. More specifically, in the illustration of FIG. 4, debug-related page frame attributes are supplied (405) and encoded in one or more paged memory management stores (e.g., page tables, translation lookaside buffer (TLB) entries, etc.) illustrated collectively as page translations 410. Persons of ordinary skill in the art will appreciate any of a variety of suitable implementations for MMU 450 and, more generally, for a paged memory management system. For clarity, and without limitation on the range of suitable implementations, we illustrate only those aspects of a simplified paging system pertinent to an illustration of our techniques.

As is conventional, MMU 450 provides translations of virtual addresses (e.g., instruction fetch address 427) to physical addresses in addressable storage (e.g., physical address 499 corresponding to location 471 in memory and/or cache 420). Consistent with the memory paging system illustration, addressable storage is viewed at page frame level of granularity, such that a page frame corresponding to virtual address 498 is mapped using page translations 410 to a corresponding page (e.g., physical page 458) in physical address space. As is also conventional, page attributes 411 are coded in association with mappings 412. For example, in some memory paging system implementations, write-through (W), caching-inhibited (I), memory-coherency-required (M), guarded (G) and endianness (E) attributes may be specified as constituent indications within page attributes 411 that are associated with individual translations. To support our address-qualified conditional debug techniques, we add an additional debug-disable (D) attribute to page attributes 411, which may be provided (in some implementations) using an attribute specifically defined in the paging system implementation or (in other implementations) using an otherwise unallocated user-definable page attribute. Whatever the particular coding, the particular debug-disable (D) indication 413 retrieved from page translations 410 in connection with fetch of a particular debug-type instruction instance stored at addressed location 471 is used to determine execution semantics for the fetched instruction instance.

In the illustration of FIG. 4, virtual-to-physical page translations 418 and 419 correspond to respective physical pages 458 and 459 in physical address space. Accordingly, based on corresponding debug-disable (D) indications set (405) in page translations 410, debug-type instruction instances fetched from physical addresses within pages 458 and 459 are executed with nop semantics. For purposes of illustration, we assume, in the illustrated embodiment, that a set debug-disable (D) indication 413 indicates that a corresponding debug-type instruction should be executed with nop semantics. Of course, other coding senses may be employed.

In general, nop semantics may be provided in any of a variety of ways. For example, MMU 450 may annotate (452) the fetched debug-type instruction instance (or the cache line or other fetch unit in which the debug-type instruction instance appears) to mark it for later substitution (or overloading) at a convenient point along an instruction path. In particular, the opcode of a debug-type instruction instance so annotated may be replaced (or overloaded) with a nop instruction opcode in fetch unit 426 (e.g., at 453) or in instruction decoder 422 (e.g., at 454). Alternatively, MMU 450 could itself substitute or overload the nop instruction opcode, although this presumes a level of instruction set knowledge generally not provided in a memory management unit.

Figure 5:
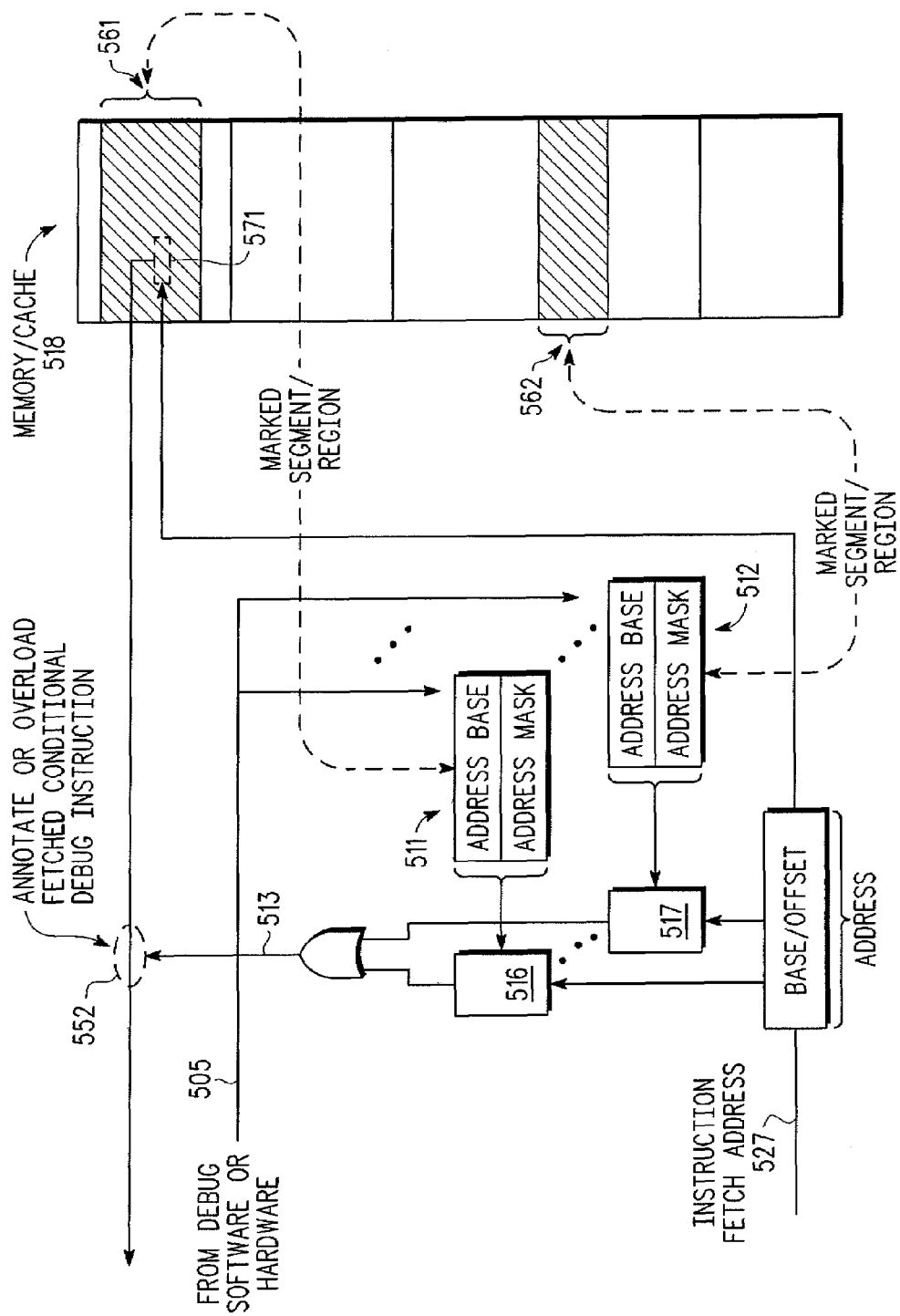
FIG. 5 illustrates operation of one or more embodiments of the present invention using a segment or region marking technique to facilitate conditional debug operation based on address.

FIG. 5 illustrates operation of one or more embodiments of the present invention in which a segment or region marking technique is used to facilitate conditional debug operation based on the memory address of a particular debug instruction instance. As before, address-based qualifiers are represented in storage based on indications supplied (505) from debug hardware and/or software. More specifically, in the illustration of FIG. 5, address base/mask pairs (511 . . . 512) are used to mark corresponding segments or regions (561, 562) of addressable storage represented in memory and/or cache 518. Instruction fetch address 527 is compared against address base/mask pairs using a collection of comparators (516 . . . 517) and based on a match, an indication 613 is supplied that results in annotation (552) and/or substitution/overloading (at a convenient point along an instruction path) of the corresponding debug-type instruction instance(s).

In the illustration of FIG. 5, debug-type execution semantics of the instruction instance retrieved from location 571 in addressable memory are suppressed based on correspondence of the instruction fetch address 527 with one or more of the address base/mask pairs (511 . . . 512). Consistent with the preceding description, we assume that address base/mask pair indicates that a corresponding debug-type instruction is to be executed with nop semantics, although other coding senses may be employed. As before, convenient points along the instruction path include a fetch unit or instruction decoder.

Figure 6:
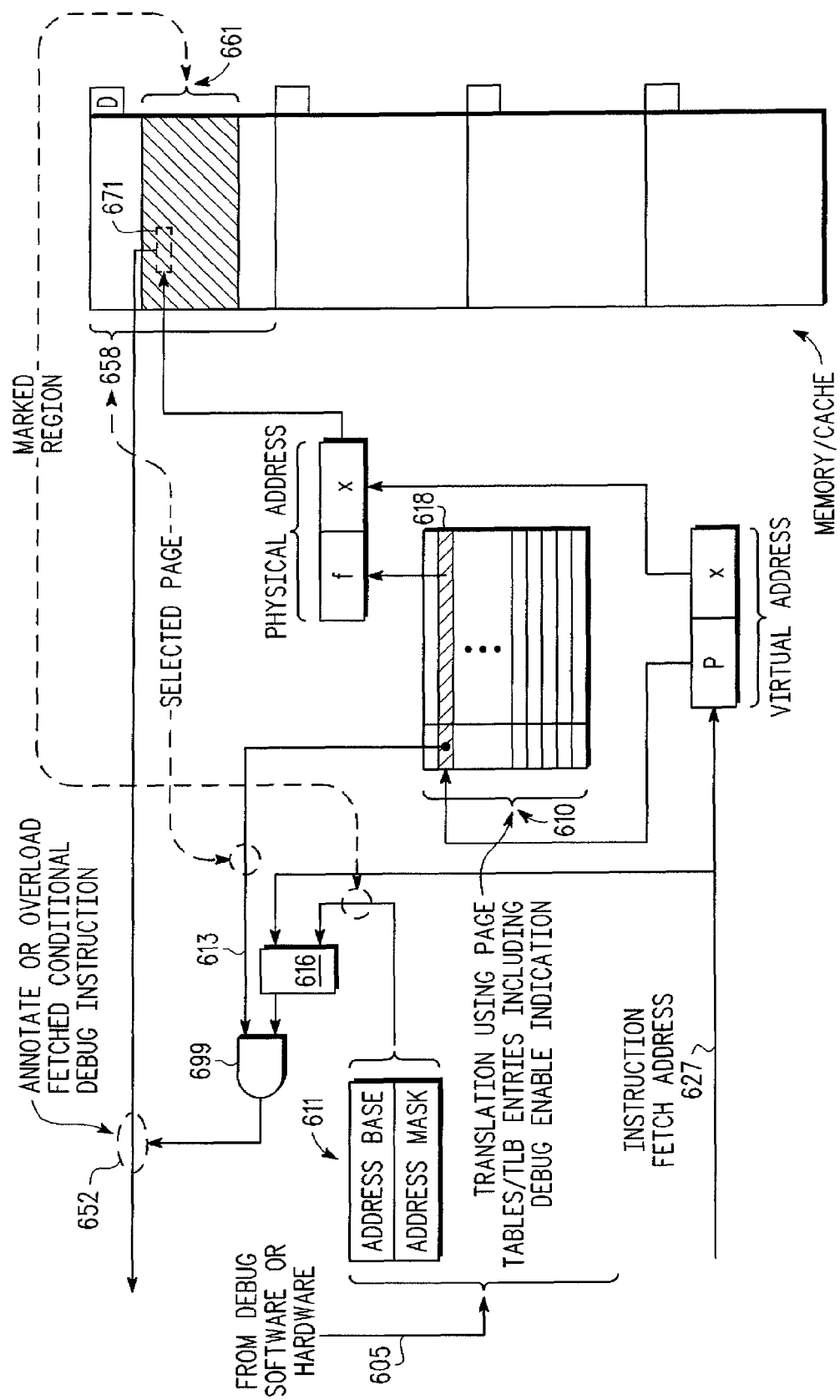
FIG. 6 illustrates operation of one or more embodiments of the present invention in which a composition of memory paging system and segment or region marking techniques is employed to facilitate conditional debug operation based on address.

Building on the preceding examples, FIG. 6 illustrates operation of one or more embodiments of the present invention in which a composition of memory paging system and marking techniques are employed to facilitate conditional debug operation based on address. As before, address-based qualifiers are represented in storage based on indications supplied (605) from debug hardware and/or software. However, in the illustration of FIG. 6, both page frame attributes and address base/mask pairs are supplied. As before, page frame attributes are encoded in one or more paged memory management stores (e.g., page tables, translation lookaside buffer (TLB) entries, etc.) illustrated collectively as page translations 610. In particular, entry 618 thereof (which corresponds to instruction fetch address 627) provides the translation that identifies page 658 as the page in addressable memory in which location 671 (and the fetched debug instruction) resides.

In the illustration of FIG. 6, address base/mask pairs (e.g., address base/mask pair 611) are used to mark corresponding region 661 within page 658 and to further delimit the portion of addressable storage for which debug-type execution semantics are to be suppressed. In particular, FIG. 6 illustrates an AND composition (see logic 699) of (i) results of a comparison (616) between instruction fetch address 627 and contents of address base/mask pair 611 and (ii) the debug-disable (D) indication 613 retrieved from page translations 610 in connection with the corresponding fetch of a particular debug instruction instance stored at addressed location 671. Accordingly, the illustrated configuration provides a mechanism for narrowing the set of memory locations for which debug execution semantics are to be suppressed to a subset of those appearing in pages having debug-disable (D) indications.

Of course, other compositions of page and region indicators are possible and envisioned. For example, in one variation, a NOT-AND composition can be used to exclude addressable locations that match address base/mask pair 611 from those that otherwise fall within the coverage of a page for which a debug-disable (D) indication has been coded. Similarly, in another variation, an OR composition can be used to include addressable locations that either match address base/mask pair 611 or fall within the coverage of a page for which a debug-disable (D) indication has been coded. Furthermore, although we illustrate a simple, single-stage composition of two inputs, larger numbers of inputs and more complex combinatorial schemes may be employed, if desired. In each case, annotation (e.g., 652) and/or substitution/overloading (at a convenient point along an instruction path) are performed for corresponding debug-type instruction instance(s).

Referring to the particular illustration of FIG. 6, debug-type execution semantics of the instruction instance retrieved from location 671 in addressable memory are suppressed based on correspondence of the instruction fetch address 627 with both (i) an entry (618) of translations 610 in which a set debug-disable (D) indication 613 appears and (ii) contents of address baselmask pair (611). Consistent with the foregoing, we assume that the debug-disable (D) indication and address base/mask pair cover debug-type instruction instances that are to be executed with nop semantics, although other coding senses may be employed. Also as before, convenient points along the instruction path for substitution/overloading with a nop opcode include a fetch unit or instruction decoder.

Other Embodiments

Process identifiers (PID) or address space identifiers (ASID) are often employed in processor implementations and can be used to provide each execution process with its own unique virtual address space. Accordingly, in some embodiments of the present invention, all or a portion of such a PID or ASID field value may be used in a comparison that establishes a set of addresses for which debug-type or nop execution semantics is desired. For example, such a use of PID or ASID field values may include (or exclude) those addresses that fall within a virtual address space associated with a particular process or thread in (or from) a set for which particular execution semantics are specified.

In some embodiments of the present invention, virtualization techniques may be employed. Virtualization often establishes logical partitions which operate independent of each other in distinct address spaces. For example, some multi-threaded processor implementations, each virtual processor may be assigned to a logical partition. Similarly, in a multi-processor system, each physical processor may be assigned to a logical partition. In general, logical partition assignments may be made by assigning partition ID (LPID) values. A partition ID value forms an extension of the virtual address and can be used to match against the logical partition value for each TLB entry during address translation. Accordingly, in some embodiment of the present invention, all or a portion of a LPID field value may be included as an input to range comparison logic to allow for further specification of one or more virtual address spaces or partitions.

In general, address space comparisons (whether based on use of PID, ASID or LPID field values or some virtualization facility) may be employed separately or in combination with lookup or comparisons illustrated or described with reference to FIGS. 3-6. Arguably, similar functionality could be provided by marking appropriate page attributes on those pages that correspond to an address space; however, marking/unmarking the pages can be time consuming or inconvenient. Therefore, in some embodiments, the preceding alternatives may be attractive.

Although the invention is described herein with reference to specific embodiments, various modifications and changes can be made without departing from the scope of the present invention as set forth in the claims below. For example, while we have described techniques in the context of certain illustrative debug instructions and memory architectures, our techniques are not necessarily limited thereto. Also, in one embodiment, a class of debug instructions allow for grouping of debug instructions into independent groups, where each group has independent control over the action or actions to be taken upon execution, thereby providing additional debug flexibility. These groups may be independently controlled, and the resulting actions may be dynamically modified by either a hardware or software debugger. Techniques of the present invention may also be employed to provide address-qualification for group-delimited debug instructions.

Embodiments of the present invention may be implemented using any of a variety of different information processing systems. Accordingly, while FIGS. 1 and 2, together with their accompanying description relate to exemplary data processing system and processor architectures, these exemplary architectures are merely illustrative. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, system and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

In general, the terms "program" and/or "program code" are used herein to describe a sequence or set of instructions designed for execution on a computer system. As such, such terms may include or encompass subroutines, functions, procedures, object methods, implementations of software methods, interfaces or objects, executable applications, applets, servlets, source, object or intermediate code, shared and/or dynamically loaded/linked libraries and/or other sequences or groups of instructions designed for execution on a computer system.

All or some of the program code described herein, as well as any software implemented functionality of information processing systems described herein, may be accessed or received by elements of an information processing system, for example, from computer readable media or via other systems. In general, computer readable media may be permanently, removably or remotely coupled to an information processing system. Computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and media incident to data transmission including transmissions via computer networks, point-to-point telecommunication equipment, and carrier waves or signals, just to name a few.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method comprising:
executing code on a processor, the code including at least first and second instances of a same debug instruction; and
selecting an execution mode for individual ones of the debug instruction instances based on respective addresses thereof in memory addressable by the processor, wherein based on the respective addresses, the first debug instruction instance executes with no-operation (NOP) semantics and the second debug instruction instance executes with debug-related semantics.

2. The method of claim 1, wherein the selecting includes:
checking a debug attribute for a memory page in which a particular instance of the debug instruction resides; and
based at least in part on the debug attribute, selecting one of the no-operation (NOP) semantics and the debug-related semantics.

3. The method of claim 2, further comprising:
maintaining the debug attribute in connection with virtual-to-physical page mapping information.

4. The method of claim 1, wherein the selecting includes:
comparing a memory address for a particular instance of the debug instruction with contents of one or more stores that delimit one or more respective portions of the memory; and
based at least in part on correspondence of the memory address with a delimited portion, selecting one of the no-operation (NOP) semantics and the debug-related semantics.

5. The method of claim 1, wherein the selecting includes:
performing both a page attribute check and a comparison against delimited portions of memory; and
based on a composition of the page attribute check and delimited portion comparison, selecting one of the no-operation (NOP) semantics and the debug-related semantics.

6. The method of claim 1,
wherein the selecting disables otherwise operative debug-related semantics of the debug instruction.

7. The method of claim 1,
wherein the selecting enables otherwise latent debug-related semantics of the debug instruction.

8. The method of claim 1, further comprising:
decoding the first debug instruction instance in accordance with the address-based selection of NOP semantics to produce a NOP instruction; and
executing the NOP instruction.

9. The method of claim 1, wherein the debug instruction is selected from a set of instructions that include or implement functionality of one or more of:

a debug notify halt (DNH) instruction;
a breakpoint or watchpoint instruction; and
a debug exception.

10. A method of controlling debug behavior of a processor, the method comprising:
identifying first and second address-delimited portions of a memory for which instances of a debug-type instruction residing therein are to be executed by the processor with differing semantics; and
conveying a machine readable encoding consistent with the first and second address-delimited portions to storage accessible to the processor, wherein logic of the processor is selective for execution semantics based on a comparison between the conveyed address-delimited portions and respective addresses in the memory of executed instances of the debug-type instruction.

11. The method of claim 10,
wherein the conveying is either via an external debug interface or is based on software executable on the processor.

12. The method of claim 10, further comprising:
executing code on the processor, the code including at least first and second instances of the debug instruction, wherein based on the conveyed address-delimited portions and respective addresses of the first and second debug instruction instances, the first debug instruction instance executes with no-operation (NOP) semantics and the second debug instruction instance executes with debug-related semantics.

13. The method of claim 10,
wherein the logic is responsive to either or both of a set of memory page-associated debug attributes and one or more address-delimiting debug registers of the processor.

14. An apparatus comprising:
a processor that implements an instruction set that includes a debug-type instruction; and
logic of the processor selective for a respective execution mode for respective instances of the debug-type instruction based on respective addresses thereof in memory addressable by the processor.

15. The apparatus of claim 14, further comprising:
a memory management unit that maintains in association with page mapping information, a debug attribute for memory pages,
wherein the logic selective for execution mode is responsive, with respect to a particular instance of the debug-type instruction, to the debug attribute for the memory page on which the particular debug-type instruction instance resides.

16. The apparatus of claim 14, further comprising:
one or more machine readable stores of the processor writable to identify respective one or more address-delimited portions of the memory,
wherein the logic selective for execution mode is responsive, with respect to a particular instance of the debug-type instruction, to a comparison between contents of the machine readable stores and a memory address at which the particular debug-type instruction instance resides.

17. The apparatus of claim 14,
wherein based on its respective address, a first instance of the debug-type instruction executes with no-operation (NOP) semantics, and
wherein based on its respective address, a second instance of the debug-type instruction executes with debug-related semantics.

18. The apparatus of claim 14, further comprising:
a memory management unit that maintains in association with page mapping information, a debug attribute for memory pages; and
one or more machine readable stores of the processor writable to identify respective one or more address-delimited portions of the memory,
wherein the logic selective for execution mode is responsive, with respect to a particular instance of the debug-type instruction and its address in the memory, to a composition of both the associated debug attribute and the address-delimited portions of the memory.

19. The apparatus of claim 18,
wherein the composition is characterized in that both the page-associated debug attribute and one of the address-delimited portions of memory are selective for debug-related semantics.

20. The apparatus of claim 18,
wherein the composition is characterized in that either the page-associated debug attribute or one of the address-delimited portions of memory is selective for debug-related semantics.

\* \* \* \* \*